United States Patent [19]

Li

[11] 4,127,320
[45] Nov. 28, 1978

[54] MULTIMODE OPTICAL MODULATOR/SWITCH

[75] Inventor: Tingye Li, Rumson, N.J.

[73] Assignee: Bell Telephone Laboratories, Incorporated, Murray Hill, N.J.

[21] Appl. No.: 811,296

[22] Filed: Jun. 29, 1977

[51] Int. Cl.² ............................................. G02B 5/14
[52] U.S. Cl. .............................. 350/96.13; 350/96.15
[58] Field of Search ............... 350/96.11, 96.12, 96.13, 350/96.14, 96.15, 96.30, 150, 356

[56] References Cited

U.S. PATENT DOCUMENTS

| 3,589,794 | 6/1971 | Marcatilli | 350/96.10 |
|---|---|---|---|
| 3,695,745 | 10/1972 | Furukawa | 350/96.14 |
| 3,920,314 | 11/1975 | Yajima | 350/96.12 |
| 3,976,358 | 8/1976 | Thompson | 350/96.13 |

OTHER PUBLICATIONS

B. Chen et al., "Horn Structures and Thin Film Optical Switch", IEEE/OSA Conf. on Laser Eng. and Appl., Jun. 1, 1977, pp. 8–9.
H. Sasaki et al., "Electro–Optic Y–Junction Modulator/Switch", Electronics Letters, vol. 12, #18, Sep. 1976, pp. 459–460.
R. Ulrich, "Image Formation by Phase Coincidences in Optical Waveguides", Optics Communication, vol. 13, #3, Mar. 1975, pp. 259–264.
R. Ulrich et al., "Self–Imaging in Homogeneous Planar Optical Waveguides", Applied Physics Letters, vol. 27, #6, Sep. 1975, pp. 337–339.
R. Ulrich, "Self–Imaging in Homogeneous Optical Waveguides", Topical Meeting on Integrated Optics, Jan. 12–14, 1976, pp. TuB4–1–4.
M.A.R.P. de Barros et al., "High–Speed Electro–Optic Diffraction Modulator for Baseband Operation", Proc. of IEEE, Jul. 1977, vol. 119, #7, pp. 807–814.
E. A. Ash et al., "Switchable Optical Waveguide", IBM Tech. Disc. Bulletin, vol. 14, #3, Aug. 1971, pp. 999–1000.
J. E. Goell, "A Circular–Harmonic Computer Analysis of Rectangular Dielectric Waveguides", The Bell Sys. Tech. Jrnl., vol. 48, #7, Sep. 1969, pp. 2133, 2140, 2147, 2149.

*Primary Examiner*—John K. Corbin
*Assistant Examiner*—Rolf Hille
*Attorney, Agent, or Firm*—James F. Hollander

[57] ABSTRACT

A multimode optical waveguide having refractive index $n$, width $a$, and length L is provided with branches on either side of each end and has an electrode pattern capable of differentially delaying the even modes and the odd modes of light of wavelength $\lambda$ in the waveguide when voltage is applied. When the length L is a half-critical length, calculated to be $(2na^2/\lambda)$, or multiple thereof, the device acts as an amplitude modulator or switch. At least one of the electrodes typically is very slender and has a width less than about one-fourth the waveguide width $a$, so as to achieve different effects on the different modes by causing a laterally nonuniform but bilaterally symmetric refractive index change in the waveguide.

23 Claims, 9 Drawing Figures

MULTIMODE OPTICAL MODULATOR/SWITCH

BACKGROUND OF THE INVENTION

The present invention relates to the field of optical communications. In recent years, increasing interest and attention have been attracted to processing and transmitting large amounts of communications information from many sources to many destinations on tiny beams of light carried in optical waveguides. In order to route information from each source to each destination, it is necessary to provide modulating apparatus for first impressing the information upon light at its source. Then the light is switched appropriately along its way so that it follows a path to its intended destination at the same time as other sources of light are switched or coupled along correct paths to their correct destinations.

In the prior art a variety of modulator and switch devices have been proposed which use substrates of crystalline material such as gallium arsenide (GaAs), lithium niobate ($LiNbO_3$), or lithium tantalate ($LiTaO_3$), the optical properties of which are sensitive to electric fields produced by means of a voltage source connected to electrodes deposited thereon. The amount of light leaving such a device can be varied in its intensity or amplitude for modulation or can be turned on and off in intensity in a given direction when switching action is desired.

The suitability of a given modulator or switch device relates to practical considerations.

(A) SIMPLICITY

The device should require a minimum of parts or structures to accomplish its operation thereby to decrease the number of steps in its manufacture and to decrease the likelihood of device malfunction.

(B) RELAXED TOLERANCES

The device should require no critical sizes or shapes of parts or critical separations or gaps in its construction.

(C) SMALL SIZE

The device as a whole should be small enough to permit ready fabrication of hundreds or thousands of copies on a single substrate as in an integrated optics switching array.

(D) TOLERANCE TO MULTIMODE OPTICAL INPUTS

The device should be able to modulate or switch energy from light sources such as lasers having considerable energy in higher order modes. Many prior art devices are mode-sensitive in that if energy other than that in a single mode is provided, then depth of modulation or extinction ratio and freedom from crosstalk are impaired.

(E) LOW LIGHT LOSS

The device should avoid sending unwanted light in uncontrolled directions since buildups of stray light can be highly disadvantageous in densely packed arrays of devices.

(F) LOW CAPACITANCE

The device should feature low capacitance so that it can follow wide bandwidth modulating signals or fast-risetime switching pulses.

(G) LOW ENERGY REQUIREMENT

The device should require low energy (often measured in microwatts per megahertz) to perform its operation. Given a device capacitance, a lower operating voltage implies a lower energy requirement.

(H) TUNABILITY

Where a critical condition must be satisfied in order to permit the most advantageous operation the device should be readily tunable, preferably electrically, so that the condition can be met.

The present invention has as an object to provide an optical modulator/switch of an alternative type to the optical modulators and switches of the prior art by providing a structure which is advantageous in each of the above-listed respects.

SUMMARY OF THE INVENTION

In the invention, a strip multimode waveguide is employed, meaning a waveguide having length, width and thickness surrounded by lower refractive index material or otherwise such as to confine light by the well-known phenomenon of total internal reflection. The waveguide is of multimode type, meaning that its dimensions are large enough compared to the wavelength of light to be modulated or switched so that more than one electromagnetic optical mode can propagate therein. Light for processing from a source to be modulated or switched is permitted to enter at only one side of an input end of the waveguide. Introduction of the light in such laterally offset manner is accomplished by an accurately positioned light source or from an input strip waveguide of smaller width. The smaller waveguide is suitably of either single mode or multimode type. If good coupling to a multimode optical source be desired, the invention readily permits the same when a multimode introducing waveguide is used. Because the light enters from only one side per source, the invention can even accommodate two sources at once by means of a branched introducing waveguide or other suitable light introduction means.

The light introduced into the multimode main waveguide travels in even and odd modes, which in general have different propagation velocities, to an output end of the waveguide. At certain critical lengths the original light entering the multimode waveguide is reconstructed or concentrated either in double on either side of the output end or reproduced essentially intact on one or the other side of the output end. By applying a physical influence such as an electric field with appropriately positioned electrodes so as to impress or induce a laterally nonuniform but transversely or bilaterally symmetric refractive index change in the waveguide, the speed or velocity of propagation of the even modes relative to the odd modes can be differentially affected so as to control the way that the light exits from the output end of the waveguide. Thus, modulation and switching functions are made possible.

In a number of the inventive embodiments one or more of the electrodes are symmetrically disposed on a face of the multimode waveguide, parallel to the waveguide length and have an electrode width of less than one-fourth of the waveguide width in order to produce the nonuniform fields required. The polarity and intensity of a voltage provided to the electrodes determine which side the light is switched or modulated into. Means of separating light exiting from one side of the output end from light exiting from the other output side can be readily provided, as in the form of a bilaterally symmetric branched output waveguide.

The multimode optical modulator/switch of the invention features simplicity in that its construction involves only a single undivided waveguide with branches at either end and electrodes deposited thereon. The waveguide width is not very critical because it is of multimode type, and there are no multiple waveguides of a directional coupler variety requiring a precise gap between them. The lengths of the inventive modulator/switch are on the order of 1 centimeter or less for a suitable waveguide width dimension when light of a given wavelength λ in the optical spectrum, including the visible, near-infrared, or ultraviolet range, is employed. There is low light loss because the light is guided all along its way, as by strip waveguides. Switching voltages and capacitance are low in view of the relatively miniature dimensions of the invention as demonstrated by calculations disclosed hereinbelow. The invention is readily tunable such as by adjusting the voltage providable to the electrodes.

The invention can find use as a single discrete modulator/switch component in optical fiber communication systems. It is readily adaptable to batch processing of large switching arrays in an integrated optics assembly for switching large number of communications sources to large numbers of destinations, and for providing digital logic devices and other apparatus utilizing the invention in various combinations.

DETAILED DESCRIPTION OF THE DRAWING

Figure 1:
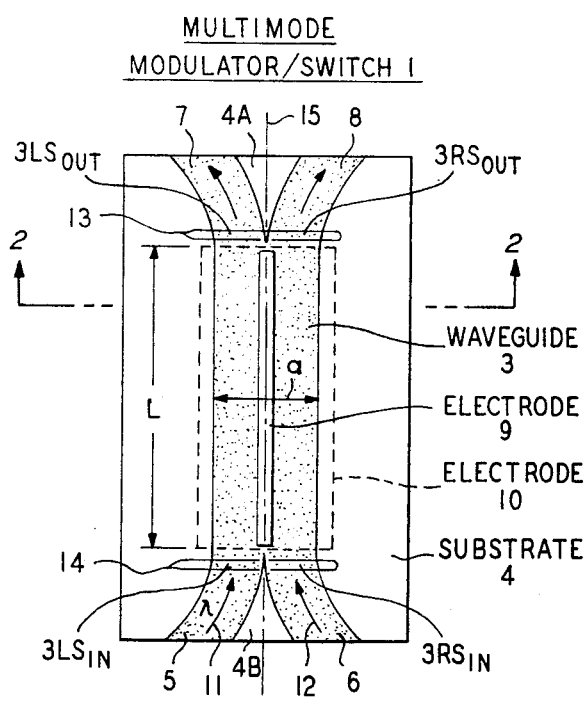
FIG. 1 shows a greatly magnified plan view of an optical modulator/switch according to the present invention for use in an integrated optics circuit. The length L is considerably compressed in scale compared to width $a$ for clarity.

FIG. 1 shows the inventive multimode optical modulator/switch as seen from above. The device includes a single multimode optical strip or channel waveguide 3 resembling a center strip having input double-waveguide branches 5 and 6 and output branches 7 and 8 at each end. The waveguide 3 and its input and output branches are located on or diffused, as by titanium indiffusion, into a substrate 4 of suitable material of a lower refractive index so that light of a wavelength λ in the near-infrared, visible optical, or ultraviolet regions of the spectrum propagates by total internal reflection therein. The lateral dimension or width of the waveguide 3 material is designated $a$, and the refractive index of the material is designated $n$. The waveguide 3 has a length L between an input end 14 joined with symmetric branches 5 and 6 for introduction of light energy and an output end 13 joining symmetric branches 7 and 8 for separation of light energy. Cuspate or prism-shaped low-index substrate portions 4A and 4B act as separation portions between braches 7 and 8 and 5 and 6. The branches respectively lead away from and lead toward output portion 13 and input portion 14. Branches 5, 6, 7 and 8 join in cross-section with waveguide 3 at left input side $3LS_{IN}$, right input side $3RS_{IN}$, left output side $3LS_{OUT}$, and right output side $3RS_{OUT}$ respectively. The length L is dozens or hundreds of times the width $a$. The high-index waveguide 3 material has an undivided, unitary cross-section along all its length for propagation of optical modes. A slender electrode 9 at the center 15 of waveguide 3 and a wide electrode 10 are located on the top and bottom faces 16 and 17 (see FIG. 2) of the waveguide 3 and substrate 4. When a voltage V is applied to the electrodes a processing of optical energy 11 and 12 in a modulation or switching action is obtained. Electrodes 9 and 10 induce a refractive index change which may be either positive or negative but which is primarily centered in intensity beneath electrode 9 all along length L and is relatively small over other portions of the waveguide width.

For example, if light energy 11 having wavelength λ is introduced through branch 5 so as to be incident upon only the left side $3LS_{IN}$ of the input end cross-section 14 of waveguide 3, the light propagates in many TE (transverse electric) and TM (transverse magnetic) modes. Each mode has a number, and the modes include odd modes (TE2, TM2, TE4, TM4, TE6, TM6, etc.) and even modes (TE1, TM1, TE3, TM3, TE5, TM5, etc.) propagating along the length of the waveguide 3 until the output end 13 is reached. For mode diagrams see "A Circular-Harmonic Computer Analysis of Rectangular Dielectric Waveguides" by J. E. Goell, *The Bell System Technical Journal*, Volume 48, No. 7, Sept. 1969, pp. 2133, 2140, 2147 and 2149. In the discussion of modes herein it is assumed for simplicity of description that all waveguides are single-moded in the thickness direction so that $TE_{mn} = TE_{ml} = TE_m$ and similarly for $TM_m$. However, this simplification is not believed to be necessary to the operation of the invention, many embodiments of which can be multimoded in the thickness direction.

Then the light energy 11 divides, or is separated, in a manner to be more fully described, along branches 7 and 8 propagating as light energy in the direction of the arrows drawn therein. Similarly, light energy 12 entering at branch 6 propagates in a symmetric fashion compared to light energy 11 and exits as part of the light energy in the direction of the arrows in guides 7 and 8.

It is found that depending on the light wavelength λ and the width $a$ of waveguide 3 there are certain critical lengths in waveguides of the type having the same cross-sectional dimensions as waveguide 3. These critical lengths may be experimentally determined by microscopic observation, theoretical prediction, trial and error construction, or otherwise. If light energy 11 on left input side $3LS_{IN}$ is the only entering light, then essentially all of the light will be concentrated at and exit along branch 8 on the side $3RS_{OUT}$ at the output end 13 after propagation along the least critical length. At twice the least critical length all of the light is concentrated at left output side $3LS_{OUT}$ and exits from branch 7. This latter action is to be expected, since the light energy is laterally shifted from side $3LS_{IN}$ first to the right side of guide 3 midway along its length and then shifted back to the left side $3LS_{OUT}$ due to travel along two least critical length portions.

In general, if light energy is incident on waveguide 3 through branch 5, then at odd integer multiples of the critical length, it will exit through branch 8. At even integer multiples of the critical length the energy will exit through branch 7. Correspondingly, light energy 12 incident through branch 6 will exit through branch 7 when L is an odd integer multiple of the least critical length and through branch 8 when L is an even integer multiple of the least critical length.

If light energy 11 is composed of not one but two or more quite distinct wavelengths, then waveguide 3 will present different effective lengths and may provide a form of filtering action in that the distinct wavelengths can be concentrated at opposite output sides of waveguide 3 and then be separated. Similarly, if light energy 11 and light energy 12 are each substantially monochromatic at different wavelengths, then a signal-combining or multiplexing function is permitted. It is further found that waveguide 3 at odd multiples of one-half the least critical length is such as to cause the entering energy 11 to be split approximately equally between branches 7 and 8. Thus, a light splitting or 3dB coupler effect can be obtained. The just-mentioned filtering, combining, and 3dB coupling properties of a passive multimode waveguide (without electrodes) have been recognized in the prior art and reference may be made to R. Ulrich et al. "Self-Imaging in Homogeneous Planar Waveguides", *Applied Physics Letters*, Vol. 27, No. 6, 1975, pp. 337–339.

In the present invention it is recognized that electrical control over the properties of the waveguide 3 may be advantageously exploited to produce a variety of useful modulator and switch embodiments. For instance as shown in FIG. 1, a waveguide 3 having a length L of an integer multiple most suitably between 1 and 4 inclusive of approximately one-half the least critical length is provided with a slender electrode 9. Electrode 9 can have an electrode width $w$ of less than approximately one-quarter $a$ and an electrode length approximately equal to that of waveguide 3. The waveguide length is selected so as to be less than about 1 centimeter so that the device will be suitably miniature in size. On a bottom side of the waveguide 3 opposite electrode 9 and extending all along the length of the waveguide material is an electrode 10 suitably equal to or greater in width than electrode 9 and having a length about equal to or greater than that of the waveguide 3. Electrodes 9 and 10 may be applied or constructed on or near the waveguide 3 in any suitable manner so as to accomplish their function. If an insulating layer or optical barrier layer is needed between each electrode and the waveguide, the same can be provided. As shown in FIG. 1, electrode 10 is of approximately the width of the waveguide 3 and both electrodes 9 and 10 are located or centered symmetrically with respect to a longitudinal center plane 15 of the waveguide width. A transverse conductor from a contact pad (not shown) may be used to provide voltage to electrode 9, although any such transverse conductor should be of relatively small area on waveguide 3 compared to electrode 9 so as not to disturb the electric fields of electrode 9.

Figure 2:
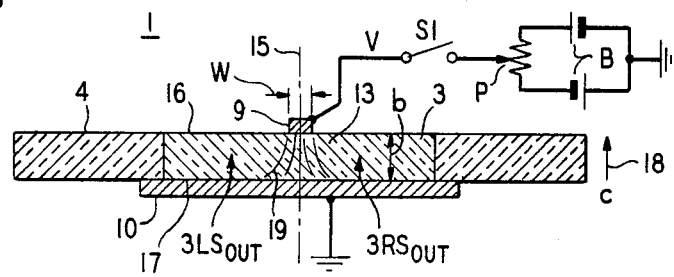
FIG. 2 is a transverse cross-section of the inventive optical modulator/switch shown in FIG. 1, which operates by preponderately affecting the propagation of optical even modes.

FIG. 2 shows a cross-section through multimode switch 1 of FIG. 1. Again, electrodes 9 and 10 are shown located symmetrically with respect to center plane 15 with only slender electrode 9 having width $w \leq a/4$ touching a top surface, side, or face 16 of waveguide 3. Substrate 4 has a lower or bottom surface 17 upon which relatively wide electrode 10 has been deposited. Batteries B and adjustable potentiometer P as shown, or a waveform generator or other means for generating a tunable positive or negative voltage V, are connected via electrical switch S1, to electrode 9, and electrode 10 is suitably connected to ground or to any other appropriate point in the electrical circuit of which device 1 forms a part. The propagation of the even and odd waveguide modes is affected so that the optical energy as a whole essentially exits from a first side $3LS_{OUT}$ of the output end 13 of the waveguide 3 when one value of the voltage V is provided and so that the optical energy exiting from the first side $3LS_{OUT}$ is substantially changeable in intensity in response to a change in the voltage V so that the energy is processable with respect to the amount thereof leaving that side of the output end of the waveguide. Similar processing of the light exiting from side $3RS_{OUT}$ can also be made to occur.

Some embodiments of the invention cause the electrodes and waveguide material to cooperate electrooptically by employing a substrate 4 composed of lithium niobate ($LiNbO_3$) or lithium tantalate ($LiTaO_3$) having a $c$-axis 18 perpendicular to the surface of the substrate 4. Multimode waveguide 3 is formed by deep titanium indiffusion in the electrooptic substrate so as to form the strip waveguide 3 with branches 5, 6, 7 and 8. The thickness of the waveguide 3 is on the order of the wavelength λ of the light energy or greater. The width $a$ should be greater than or equal to twice the thickness of the waveguide 3. The indiffusion may not produce a precisely rectangular cross-section of the waveguide, in which case the effective width $a$ of the multimode waveguide may be somewhat affected, but this can be taken into account in the design. When the voltage V is present, an electric field 19 substantially perpendicular to top surface 16 of waveguide 3 and substantially parallel to $c$-axis 18 is set up. The optical TM modes see a refractive index change via the $r_{33}$ coefficient since their optical electric field is parallel to the $c$-axis. The optical TE modes see a refractive index change via the $r_{13}$ coefficient since their optical electric field is normal to the $c$-axis. If desired, only TE modes or only TM modes may be used to the exclusion of the others, in which case only one of the coefficients enters the discussion.

The electric field set up when a voltage V is provided by suitable connections to the electrodes is such as to be transversely or bilaterally symmetric with respect to its component in the $c$-axis direction or other electrooptically most sensitive direction. The symmetry should be satisfied with respect to both field strength and field direction. A substantial lateral variation in field strength accompanies the symmetry. For example, the electric field 19 is substantially perpendicular to the substrate in FIG. 2 (neglecting fringing components perpendicular to the c-axis). The field 19 points "down" on either side of the center plane 15 parallel to the c-axis, so the field direction (downward) is bilaterally symmetric with respect to the center plane. Likewise, when the field vector magnitudes are equal at equal distances on either side of the center plane as they are in FIG. 2, the field strength is bilaterally symmetrical. However, a field having components which essentially point "up" on the left of center plane 15 and "down" on the right of center plane 15 is not bilaterally symmetric in field direction for the purposes of certain embodiments of the invention when the c-axis is parallel to center plane 15.

Likewise, a field having components which point to the left on the left side of center plane 15 and point to the right on the right side of center plane 15 (when the c-axis is perpendicular to center plane 15) is not bilaterally symmetric in field direction for the purposes of these embodiments of the present invention either, since a bilaterally symmetric field is intended to mean a field which points left on both sides of center plane 15 or right on both sides when the c-axis is parallel to the field and perpendicular to center plane 15.

The reason for the emphasis on symmetry of the components parallel to the most sensitive electrooptic direction is that these are the components which primarily are responsible for the refractive index changes utilized in the invention. Since the index changes must be bilaterally symmetric with respect to center plane 15 to accomplish the differential mode effects to be discussed more fully next, the field components which produce the index changes must be bilaterally symmetric in electrooptic crystals such as $LiNbO_3$ and $LiTaO_3$, too.

Figure 3:
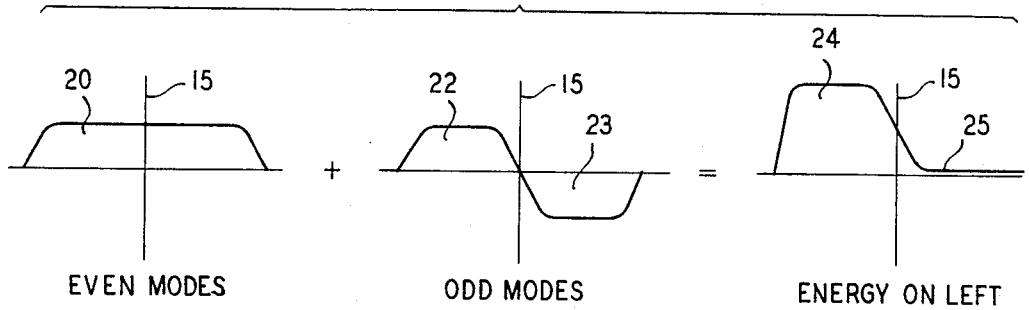
FIGS. 3, 4 and 5 are graphs of electric field strength in modes of an optical electromagnetic wave which are drawn versus distance along the width of a multimode waveguide to show the even and odd modes as groups in a simplified manner facilitating a description of the operation of the present invention.
Figure 4:
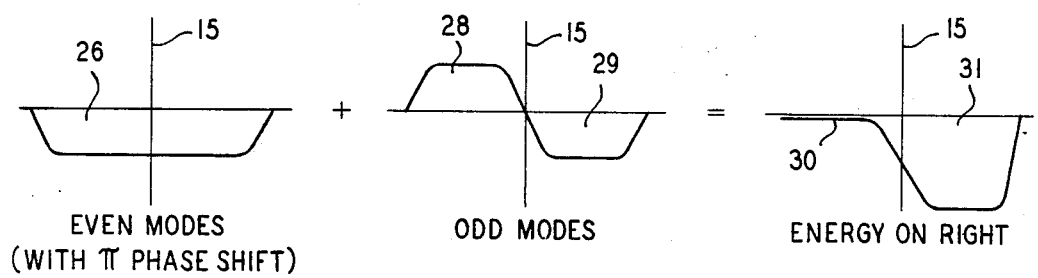

The differential mode effects of the invention will be clarified by a consideration of FIGS. 1 and 2 in light of FIGS. 3 and 4. If light energy of wavelength λ be incident through only branch 5 of device 1 of FIG. 1, the electric field diagram of input end 14 of waveguide 3 illustratively appears as shown in the right-hand portion of FIG. 3. A strong field portion 24 bearing substantial energy on the left side $3LS_{IN}$ of center plane 15 and a field portion 25 of negligible strength on the right-hand side $3RS_{IN}$ are incident at the input end 14 of waveguide 3. The corresponding energy distribution, not shown, is proportional to the square of the electric field of FIG. 3. The field as a whole may be mathematically described as the sum or composition of modes such that there are even modes 20 which are symmetric with respect to center plane 15 and odd modes which are antisymmetric (note opposite signs of fields 22 and 23) with respect to center plane 15. The odd modes and even modes add to yield field portion 24 bearing much energy on the left, but fields 20 and 23 of the odd and even modes respectively cancel to yield the negligible field portion 25 on the right.

It should be understood that the even modes shown as a group 20 are actually the sum, or composition, of many individual optical even modes which in general have different speeds of propagation through the waveguide 3 due to the mode-dependent wavenumber β of the waveguide. Likewise, the odd modes diagrammed as a group are actually many optical modes also having different individual speeds of propagation through the waveguide 3. It is because the even and odd modes as they propagate become cophased again at certain critical lengths along the waveguide 3 that simplified diagrams may be used and the subject of critical lengths enters the discussion. When the odd and even modes are reconstructed at the output end 13 of the waveguide in identical relative phase as at the input end 14, the energy exits from the output end as in FIG. 3 with the energy on the left, that is, through side $3LS_{OUT}$ to branch 7. An important contribution of the present invention is that it teaches how to controllably reconstruct the modes so that the amount of exiting energy can be controlled and processed.

The present invention recognizes that it is possible by means of the electrical circuit shown to apply a voltage V to the electrodes 9 and 10 so as to affect the velocity of propagation of the optical modes which are even modes without by comparison affecting the propagation of the optical modes which are odd modes. In this way the even modes 20 are all made to suffer a 180° or π phase shift with respect to their unaffected phases at the output end 13 of the waveguide 3. With no phase shift the energy exits left as in FIG. 3. But when as shown in FIG. 4 a π phase shift occurs, the optical electric field 26 of the even modes is realtively inverted, while the odd modes are reconstructed as usual. The result is that the composition of the odd modes and the phase shifted even modes of FIG. 4 produces the resultant strong field portion 31 bearing most of the energy on the right-hand side of center plane 15 of waveguide 3 so that the light energy exits through branch 8. By contrast, a negligible electric field 30 and negligible energy are now found on the left-hand side exiting through branch 7.

The operation of the FIGS. 1 and 2 embodiment of the invention is such that at certain waveguide lengths it is possible to apply a changeable voltage to electrodes which will correspondingly change the phase of the even modes by π and thereby cause light to be shifted from the left-hand branch 7 to the right-hand branch 8 or vice versa. At one value of the electrical voltage the propagating optical energy becomes concentrated in multimode waveguide 3 at only a first output side of its cross-section and exits therefrom and at another value of the voltage the propagating optical energy becomes concentrated in waveguide 3 at only an opposite output side of its cross-section and exits therefrom. Thus, an important feature or function of the invention is that a change in voltage applied to the electrodes differentially affects the velocities and hence the phases of the even and odd modes relative to each other such that the spatial character of the light energy exiting in branches 7 and 8 may be substantially changed.

The invention is able to provide differential modal phase shifts because it is possible to induce laterally nonuniform refractive index changes in the waveguide 3. However, because all the modes are symmetrical in magnitude of field strength about center plane 15 it is important that the refractive index changes exhibit bilateral symmetry as hereinbefore mentioned so as to affect the velocities of the appropriate modes as much as possible. However, it is immaterial whether the phase shifts provided are positive 180° or negative 180° in view of the identity of trigonometric functions with respect to a π phase shift. This means that appropriate modes can be either speeded up or slowed down. Therefore, the refractive index changes can be either decreases or increases.

Next follows an explanation of how the electric field produced by the electrodes of FIGS. 1 and 2 can affect the even modes with little effect on the odd modes. When the length of waveguide 3 is such that light 11 in branch 5 would exit from branch 8 without any voltage applied between electrodes 9 and 10, the application of a voltage to the slender electrode 9 produces an electric field concentrated in the center of waveguide 3 around center plane 15. This is precisely where the energy in the even modes is the greatest and the energy in the odd modes is the least. Thus, the even modes can be readily phase shifted by a centrally located refractive index change without substantially affecting the odd modes. The phase shifting of the even modes under the influence of the voltage V shifts the light from branch 8 to branch 7, and the modulation/switching is accomplished.

It should be pointed out that the light once switched remains in the appropriate branch because branches 7 and 8 are suitably of symmetrical type separated by a cuspate or tapered portion 4A of substrate 4 so as to provide means of separating any of the optical energy exiting from the left output side from any of the optical energy exiting from the right output side of waveguide 3. Thus, optical energy exiting from the respective output sides passes into the respective branches and goes to distinct destinations without significant energy transfer or crosstalk between the branches.

Recognition of the fact that the even modes can be preferentially shifted in phase by locating an electrode such that the odd modes are substantially unchanged, naturally leads to consideration of electrodes which leave the even modes essentially unaffected but strongly shift the odd modes. In other words, the voltage applying means should affect the propagation of the optical modes which are odd modes without by comparison substantially affecting the propagation of the optical modes which are even modes. It is apparent from FIG. 5 that the odd modes have very little energy near center plane 15 and at point 34 but have concentrations of energy near the peaks of the antisymmetric fields where the even mode energy is less.

Figure 5:
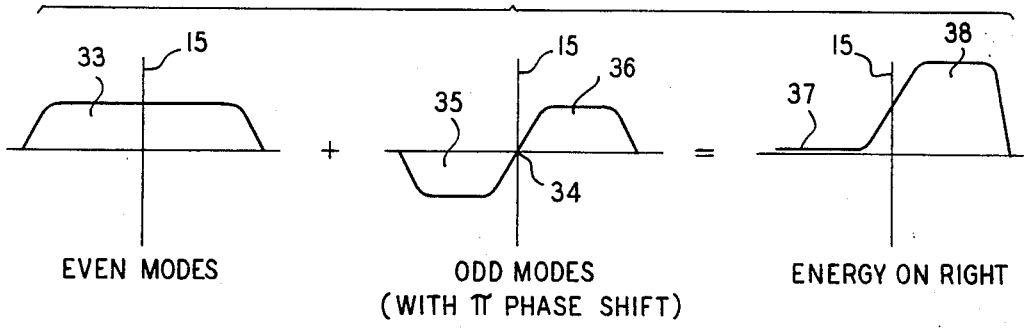

As shown in FIG. 5 phase shifting of the odd modes can suffice to switch light energy. Antisymmetric field portions 35 and 36 are respectively opposite in sign to field portions 22 and 23 of the odd modes of FIG. 3. The sum of the even mode field 33 and the odd modes of FIG. 5 yields a strong field portion 38 carrying most of the energy out the right side $3RS_{OUT}$ of waveguide 3. Insignificant field portion 37 bearing negligible energy is all that remains on the left-hand side.

Figure 6:
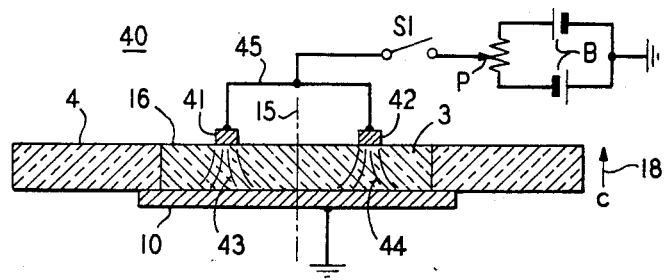
FIG. 6 is a cross-section of an embodiment of the invention for switching light by preponderately affecting the propagation of odd modes.

Accordingly, as shown in FIG. 6, an embodiment 40 of the invention for preponderately phase shifting the odd modes is shown. Multimode waveguide 3 with center plane 15, substrate 4 with $c$-axis and relatively wide grounded electrode 10 on the bottom side of waveguide 3 are the same as in FIG. 2. The difference is that the voltage source V is now connected to not one electrode but two and only two slender stripe electrodes 41 and 42. Electrodes 41 and 42 are of essentially the same shape and size located on and only on the top side or face 16 of waveguide 3. They are small in width, preferably less than one-fourth of width $a$ of waveguide 3 and are bilaterally symmetrically displaced frofm the center plane 15. In this way two electric field portions 43 and 44 are impressed upon waveguide 3 between electrodes 41 and 10 and electrodes 42 and 10 respectively. The electrodes 41 and 42 are provided with means 45 for maintaining them at equal electrical potentials such as by means of a common connection together and to the voltage source or by a narrow connecting stripe, not shown, deposited on the top of waveguide 3 transverse to the electrodes 41 and 42. The field portions 43 and 44 electrooptically affect the propagation of the odd modes with less effect on the even modes in the even mode high energy portions near center plane 15. The electrodes produce two parallel zones of refractive index increase (or decrease) which are located symmetrically on either side of center plane 15 in transverse or bilateral symmetry.

Figure 7:
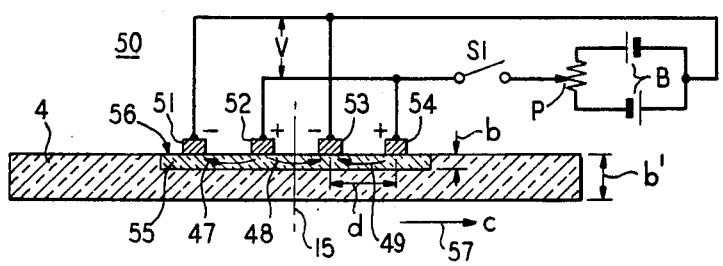
FIG. 7 is a cross-section of an embodiment of the invention for reduced voltage operation by affecting the propagation of both the even and the odd modes oppositely.

FIG. 7 shows an additional advantageous embodiment 50 employing the principles of the present invention. A multimode waveguide 55 defined by shallow indiffused titanium of thickness $b$ approximating $\lambda$ and having center plane 15 is fashioned in $LiNbO_3$ substrate 4 having thickness $b'$. Substrate 4 is cut so that the $c$-axis 57 is transverse to the waveguide length and parallel to the substrate plane. Four mutually parallel electrodes 51, 52, 53 and 54 each being in width less than one-fourth of the width $a$ are located symmetrically with respect to the waveguide width on waveguide face 56. For clarity, electrodes 52 and 53 are discussed first.

Slender stripe electrodes 52 and 53 are deposited slightly displaced on either side of center plane 15. When a potential difference V is impressed across them, a curved electric field 48, which is parallel to the $c$-axis 57 at center plane 15, produces a maximum electrooptic effect on the even modes where their energy is greatest, near the center of waveguide 55. The effect on the odd modes, however, is negligible when only electrodes 52 and 53 are employed. Thus, such a configuration is analogous to that of FIG. 2 in its operation and is fully operative to produce a nonuniform but bilaterally symmetric refractive index increase or decrease centered along center plane 15.

In an additional advantageous feature, however, electrodes 51 and 54 are included in the embodiment illustrated in FIG. 7 such that fields 47 and 49 of opposite direction to field 48 are created. Means for maintaining the four electrodes at spatially alternating relative electrical potentials are provided in the form of appropriate connections either by wires as shown or by deposited end connections to the electrodes as interdigitated electrodes. A voltage source such as the combination of batteries B, potentiometer P, and switch S1, provides interruptable or pulsed control for the device 50. The voltage source can as shown have one pole connected to electrodes 51 and 53 in common and have the other pole connected to electrodes 52 and 54 in common. In this manner the refractive index can be increased near the center of the waveguide but decreased along two parallel zones displaced laterally therefrom.

Then, the odd modes which carry most of their energy in the regions between electrodes 51 and 52 and electrodes 53 and 54 are electrooptically influenced in their propragation in an opposite manner to the even modes without significantly counteracting the effect of electrodes 52 and 53 on the even modes. The result is that the even modes and odd modes are differentially affected as groups so as to produce a differential $\pi$ phase shift between the even and odd modes with a much smaller voltage being required and hence less energy.

MATHEMATICAL THEORY EXPOSITION

The above qualitative description of the principles of the inventive modulator/switch is presently supplemented by a mathematical description which will serve to present these principles more rigorously.

Consider a multimode slab waveguide as in FIGS. 1 and 2 of width $a$, thickness $b$, and refractive index n at wavelength $\lambda$. The substrate thickness is designated $b'$ when $b'$ is different from $b$. The waveguide propagation constants $\beta$ ($\beta = (2\pi n)/\lambda$ in an extended volume of index n) of the lower-order modes which are far from cutoff can be approximated by $$\beta_{pq} \approx \frac{2\pi n}{\lambda}\left[1 - \left(\frac{\lambda p}{2an}\right)^2 - \left(\frac{\lambda q}{2bn}\right)^2\right]^{\frac{1}{2}}, \quad (1)$$

$p$ and $q$ being integer mode designations. For modes far away from cutoff, ($\lambda p << 2an$ and $\lambda q << 2bn$), the following further approximation is also valid:

$$\beta_{pq} \approx \frac{2\pi n}{\lambda}\left[1 - \tfrac{1}{2}\left(\frac{\lambda p}{2an}\right)^2 - \tfrac{1}{2}\left(\frac{\lambda q}{2bn}\right)^2\right] \quad (2)$$

Consider the case where only one variation occurs across the thickness of the waveguide ($q = 1$). The remaining modes then have propagation constants $\beta_{pl}$ which differ by $$\Delta\beta_{pl} = \frac{\pi\lambda}{n}\left[\left(\frac{p_i}{2a}\right)^2 - \left(\frac{p_j}{2a}\right)^2\right] \quad (3)$$

where $p_i$ and $p_j$ are distinct positive integer values of $p$.

The phase shift for mode $pq$ in a length L of the waveguide is $\beta_{pq}L$. The differential phase shift between modes is $\Delta\beta_{pq}L$, which for $q = 1$ and by rearranging equation (3) is given by $$\Delta\beta_{pl} L = \frac{\pi\lambda L}{4a^2 n}[p_i^2 - p_j^2]. \quad (4)$$

If it be possible to find some length or lengths L where the modes are reconstructed in phase with each other, that is, in the same phase relationship as they occur at the input end of the waveguide, then the length of waveguide 3 at which light energy exits on the same side as the side on which it entered is determined. This occurs when $$\Delta\beta_{pl}L = 2\pi m, \; m \text{ being an integer} \quad (5)$$

corresponding to each pair $p_i$ and $p_j$. Any length L which is an integer multiple of $8a^2n/\lambda$ will satisfy condition (5) as can be seen by inspection of equation (4). As will be shown next, light energy exits on the opposite side from which it enters at odd multiples of half the length $8a^2n/\lambda$ for which light exits on the same side at which it enters.

As suggested in FIG. 3, any input distribution of light energy in waveguide 3 can be analyzed as a set of modes, the even modes being symmetric with respect to center plane 15 and odd modes being antisymmetric. As shown in FIGS. 4 and 5, a mirror image of the input from an energy point of view can be produced when either the even modes are all reversed in sign or the odd modes are all reversed in sigh. This occurs when there is a 180° or $\pi$ phase shift between consecutive modes such that $$\Delta\beta_{pl}L = \pi m, \; m \text{ being an odd integer when } p_i = p_j + 1. \quad (6)$$

When condition (6) is satisfied, all the even modes are in phase with each other, since for them $p_i = p_j + 2$ so $\Delta\beta_{pl}L = 2\pi m$. All the odd modes are also in phase with each other, since for them also $p_i = p_j + 2$ and $\Delta\beta_{pl}L = 2\pi m$. But as between the even and odd modes there is a sign reversal and hence a mirror image is produced when condition (6) is satisfied.

Condition (6) can indeed be satisfied because if $$L = \frac{4a^2 n}{\lambda} \text{ then} \quad (7)$$

$$\Delta\beta_{pl}L = \pi [(p_j+1)^2 - p_j^2] \quad (8)$$

or $$\Delta\beta_{pl}L = \pi(2p_j+1) \quad (9)$$

which satisfies the condition (6) since $2p_j+1$ is odd for all $p_j$. Moreover, inspection of equation (8) shows that $L_c = (4a^2n)/\lambda$ is the least critical length at which the light energy exits from the opposite side from the one it entered. Of course, $2L_c = (8a^2n)/\lambda$ is the expression for the least critical length multiple at which the light energy exits from the same side as the one it entered. That odd multiples of $L_c$ all act like $L_c$ and even multiples of $L_c$ all act like $2L_c$ is readily seen by considering each multiple as corresponding to lengths $L_c$ in series shunting the light beam from side to side with each $L_c$.

If electrodes are placed on either side of the waveguide so as to uniformly change the refractive index of the entire waveguide, a form of switch can be conceived which operates by changing the effective critical length L. Given a maximum refractive index change $\Delta n_{max}$ obtainable in a given structure as by electrooptic means, the effective length L must be changed from an even to odd multiple $m$ (or vice versa) of $(4na^2)/\lambda$. This corresponds to the condition $$\frac{4na^2}{\lambda}(m + 1) = \frac{4(n + \Delta n_{max})a^2 m}{\lambda} \quad (10)$$

$$\text{yielding } m + 1 = m\left(1 + \frac{\Delta n_{max}}{n}\right) \quad (11)$$

If $(\Delta n_{i\,max})/n$ is on the order of $10^{-4}$, then $m = 10^4$, which means that very long waveguide lengths are required in such a hypothetical switch.

In the present invention, however, the need for such long lengths is eliminated by using electrodes which are small enough compared to the waveguide in order to differentially affect the propagation of the even and odd modes in the guide itself by presenting different refractive indices to them.

For modes of the same polarization (all TE or all TM) and with voltage applied let $n_e$ denote the effective refractive index in the waveguide for the even modes, and let $n_o$ denote the effective refractive index for the odd modes. In the absence of applied voltage, $n_e$ and $n_o$ are both equal to the refractive index $n$ of the waveguide for the modes, but when voltage is turned on the difference between $n_e$ and $n_o$ becomes significant. The phase $\phi_e = \beta L$ for the even modes is (compare equation (1))

$$\phi_e = \frac{2\pi n_e L}{\lambda}\left[1 - \left(\frac{\lambda p}{2an}\right)^2 - \left(\frac{\lambda q}{2bn}\right)^2\right]^{\frac{1}{2}} \quad (12)$$

and the phase shift for the odd modes is $$\phi_o = \frac{2\pi n_o L}{\lambda}\left[1 - \left(\frac{\lambda p}{2an}\right)^2 - \left(\frac{\lambda q}{2bn}\right)^2\right]^{\frac{1}{2}} \quad (13)$$

In addition to the phase shift introduced by differencing the waveguide terms in the square brackets with respect to $p$, as previously discussed, there is now required a 180° or $\pi$ phase shift between the even and odd modes introduced by $\Delta n = n_e - n_o$, and the following equation results:

$$\pi = \frac{2\pi(n_e - n_o)L}{\lambda} \quad (14)$$

Equation (14) satisfactorily approximates the phase shifting contribution of the slender electrode or electrodes since the contribution to the phase shift resulting from a change in $n$ from the terms in the square brackets is relatively smalll. Solving equation (14) for $\Delta n$ yields $$\Delta n = \frac{\lambda}{2L} \quad (15)$$

This $\Delta n$ is the effective refractive index change needed in order to cause light of wavelength $\lambda$ to switch from one side to the other of the output end of a multimode waveguide of an appropriate length L.

EXAMPLE I

Assume the modulator/switch of FIGS. 1 and 2 designed for use with a helium-neon (He-Ne) laser source with $\lambda = 0.633$ micrometers, $a = 50$ micrometers, $n = 2.4$ and length equal to only one critical length so that $$L = \frac{4na^2}{\lambda} \quad (16)$$

Then

L ≈ 38 millimeters.

Substituting equation (16) into (15)

$$\Delta n = \frac{1}{8n}\left(\frac{\lambda}{a}\right)^2 \quad (17)$$

$\Delta n = 8.35 \times 10^{-6}$

This effective level of $\Delta n$ is relatively easily obtained by the electroopic effect and is much smaller than the value $\Delta n_{max}$ assumed at first hereinabove.

If the thickness $b = 10\mu m$ for substrate 3, then the switching voltage V required is related to an ideal voltage V' where $$V' = \frac{\Delta n}{\frac{1}{2}n^3 r_{33}} b \quad (18)$$

when the standard electroopic effect formula involving the $r_{33}$ coefficient is employed. For LiNbO$_3$ $r_{33}$ is $31 \times 10^{-12}$ (meters/volt). Because the electrode 9 causes a refractive index change over only a portion of the waveguide cross-section, a voltage correction factor of $a/2w$ is applied. When $w = \frac{1}{4}a$, the correction factor is 2.

Substituting in (18) and applying a correction factor of 2 yields

V = 0.8 volt.

The device is of a type such that when voltage is off light incident in branch 5 of FIG. 1 exits through branch 8. With voltage on, the light exits from branch 7, and the device acts as a switch. If light is incident at both branches 5 and 6, reversing switch action is achieved. When one but not both of branches 5 and 6 carries incident light a unipolar voltage between 0 and 0.8 volts peak-to-peak can modulate the light output at branch 7.

EXAMPLE II

The length dimension of the switch of Example I can be reduced even more by reducing the width $a$ to 20 micrometers, with thickness $b$ remaining at 10 micrometers, and electrode width $w$ being 5 micrometers.

Using equations (16), (17) and (18),
L = 6.1 millimeters $\Delta n = 52.2 \times 10^{-6}$ (effective value)

V = 4.8 volts (with correction factor of 2)

It is apparent that there is an inverse proportionality between the length L and switching voltage V required. For most purposes, a width $a$ less than 50 microns is preferable so as to keep the length L small enough for practical devices (less than 1 centimeter), and the thickness $b$ is preferably less than about 25 microns or one-half the width $a$ so as to readily permit waveguide branches with an aspect ratio $a/2b$ of at least 1.0 and so as to allow switching voltages V to fall in an advantageous range.

EXAMPLE III

For integrated optics applications it is preferable to have length L be as short as possible without increasing V to impractically high values. Also, the capacitance of the modulator/switch should be low so that the electrode voltage can have a high modulation rate or very short risetime. Use of integrated optics sources based on technology in the gallium arsenide (GaAs) - gallium aluminum arsenide (GaAlAs) system makes a wavelength $\lambda$ of 0.85 micrometers or longer preferable.

In accordance with the invention it has been discovered that the length L for the modulator/switch can in fact be even shorter than $L = 4na^2/\lambda$. This unexpected resut has been found in spite of the fact that $4na^2/\lambda$ is the minimum length for single-image self-imaging in a passive multimode waveguide.

The operation of such a reduced-length modulator/switch is explained as follows. Recalling equation (4)

$$\Delta\beta_{pi}L = \frac{\pi\lambda L}{4a^2 n}[p_i^2 - p_j^2]. \quad (19)$$

When $L = 2na^2/\lambda$, $$\Delta\beta_{pl}L = \frac{\pi}{2}[p_i^2 - p_j^2] \quad (20)$$

In general the relation $p_i = p_j + 2$ defines all modes which are even in symmetry (even modes) when $p_j$ is an odd integer and all modes which are odd in symmetry (odd modes) when $p_j$ is an even integer. Substituting this relation into equation (20) yields $$\Delta\beta_{pl}L = \frac{\pi}{2}[(p_j + 2)^2 - (p_j)^2] \quad (21)$$

$$\Delta\beta_{pl}L = \frac{\pi}{2}[4p_j + 4] \quad (22)$$

$$\Delta\beta_{pl}L = 2\pi(p_j + 1) \quad (23)$$

Equation (23) shows that the even modes are all in the same phase relationship to each other after propagation through $L = 2na^2/\lambda$ as they were at the input end because $\Delta\beta_{pl}L$ is a multiple of $2\pi$ regardless of $p_j$. Equation (23) shows that the odd modes are also reconstructed in original phase relative to one another.

As between the even modes ($p_j$ an odd integer) and odd modes ($p_i = p_j + 1$), however, $$\Delta\beta_{pl}L = \frac{\pi}{2}[(p_j + 1)^2 - p_j^2] \quad (24)$$

$$\Delta\beta_{pl}L = \frac{\pi}{2}(2p_j + 1) \quad (25)$$

Equation (25) shows that the relative phase of the even and odd modes is always an odd multiple of $(\pi/2)$. Moreover, it can be seen that equation (25) shows that the odd modes as a group are offset by $-90°$ or $-\pi/2$ from the even modes as a group because $(\pi/2)(2p_j + 2)$ is a multiple of $2\pi$ for all odd integer $p_j$ and so $(\pi/2)(2p_j + 1)$ must indicate a constant offset of $-\pi/2$.

Thus, adding a phase shift of $+\pi/2$ electrooptically generates a single self-image in a half-critical-length multimode waveguide 3, and adding a phase shift of $-\pi/2$ electrooptically generates the inverted or switched single self-image in the waveguide. A bipolar modulating or switching voltage can readily provide this dual polarity $\pi/2$ phase shift.

Accordingly, a switching of the image occurs when the applied voltage is switched from one polarity to the opposite polarity. And when the applied voltage is zero, power is split between the two output ports. Thus, a highly advantageous component is obtained for use in integrated optics switching arrays because it doubles as a switch and as a 3db coupler. As a modulator this element utilizes an AC (alternating) modulating voltage requiring no DC (direct) bias or offset to amplitude modulate light leaving each output branch 7 and 8.

The parameters of this Example III embodiment are as follows:

$$L = 2na^2/\lambda, \text{ and} \quad (26)$$

using an LiNbO$_3$ substrate with $n = 2.2$, $a = 20$ micrometers, $b = 10$ micrometers, $w = 5$ micrometers, and $\lambda = 0.85$ micrometers the length of the multimode waveguide required is $L = 2.1$ millimeters.

The integer multiples of this half-critical length are also usable, of course. In particular, the integer multiples between 1 and 4 inclusive, i.e., 2.1 mm, 4.2 mm, 6.3 mm and 8.4 mm are all under 1 centimeter and can be of interest for integrated optics applications by virtue of their relatively miniature dimensions.

In order to calculate $\Delta n$ in the half-critical length embodiment, reference is made to the discussion relating to equation (14). However, only a $\pm \pi/2$ phase shift for either set of modes in the half-critical length embodiments is required to modify the $-\pi/2$ offset, so $$\pm \pi/2 = \frac{2\pi\Delta n}{\lambda}L \quad (27)$$

With $$L = 2na^2/\lambda,$$

$$\Delta n = \pm \frac{1}{8n}\left(\frac{\lambda}{a}\right)^2 \quad (28)$$

Substituting the example values for $n$, $a$, and $\lambda$ yields an effective value of refractive index change $$\Delta n = \pm 1 \times 10^{-4}.$$

The voltage required is (after correction)

$$V = \pm \frac{a\Delta n}{wn^3r_{33}}b \quad (29)$$

$$V = \pm 12 \text{ volts}.$$

Assuming a permittivity $\epsilon$ in LiNbO$_3$ of 30 times the permittivity $\epsilon_o$ of free space, a top electrode width $w$ of 5 micrometers and capacitance given by $$C = \frac{\epsilon wL}{b}, \quad (30)$$

yields $$C = 0.27 \text{ picofarad}.$$

The power required for modulation purposes at frequency $f$ and $V = 12$ volts is calculated to be $$P = \frac{1}{2}CV^2f. \quad (31)$$

$P = 20$ microwatts at 1 megahertz.

The peak electric field strength in the embodiment is $$E = (V/b) \quad (32)$$

$E = 12000$ volts per centimeter.

This value is well below the breakdown voltage in LiNbO$_3$ which is of the order of 100,000 volts per centimeter.

The modulation depth or extinction ratio obtainable in the invention is higher to the extent that the even and odd modes are differentially effected. Since higher order modes of both types have significant energy in any location in which the electrodes may be placed, an estimate of the modulation depth or extinction ratio can be derived by assuming that only a few low order modes are correctly affected, and then calculating the ratio of unintended energy on one output side to the energy leaving the other side. When such a calculation is performed assuming three modes $\sin x$, $c_1 \sin 2x$, and $c_2 \sin 3x$ with $c_1$ and $c_2$ being chosen to minimize the ratio, an extinction ratio of 22.9 dB is obtained, a value satisfactory in both modulator and switch applications. However, modulator applications do not necessarily require as high a ratio as is advantageous for switches.

EXAMPLE IV

The modulator/switch of FIG. 6 is fabricated with $a = 20$ micrometers, $b = 10$ micrometers, and identical electrode widths $w$ suitably being between 1 and 5 micrometers. $w$ is assumed to be 2.5 micrometers for the calculations. Again $L = 2na^2/\lambda = 2.1$ centimeters in LiNbO$_3$ at $\lambda = 0.85$ micrometer. The operating voltage remains approximately $\pm 12$ volts because the same index change $\Delta n$ is still required, this time for the odd modes. The capacitance C is about the same as for a single electrode 9 having a width of 5 micrometers since two electrodes 41 and 42 having $w = 2.5$ micrometers are used. So $C = 0.27$ picofarad.

EXAMPLE V

The modulator/switch of FIG. 7 is fabricated in LiNbO$_3$ with $a = 20$ micrometers, $b = 2$ micrometers, $b' = 10$ micrometers, and electrode widths of 3 micrometers or less spaced apart 2 micrometers when the 3 micrometer width is used. The electrodes clear the edges of the waveguide by 1 micrometer on either side. An indium gallium arsenide phosphide (InGaAsP) laser source of 1.20 micrometer radiation is employed.

$$L = 2na^2/\lambda = 1.5 \text{ millimeters.}$$

It should be recognized in the calculation of the refractive index change $\Delta n$ that the embodiment at any one time increases the refractive index for one set of modes, say even, and reduces it for the other set of modes, say odd. Thus, the effective index change, here call $\Delta_1 n$, in the LiNbO$_3$ for the embodiment of FIG. 7 is actually only one-half that required in other previously described embodiments of the invention.

$$\Delta_1 n = \tfrac{1}{2}\Delta n \qquad (33)$$

$$\Delta_1 n = \pm \frac{1}{16n}\left(\frac{\lambda}{a}\right)^2 \qquad (34)$$

Substituting the $n$, $a$ and $\lambda$ for this Example V embodiment yields $$\Delta_1 n = \pm 1 \times 10^{-4}$$

The voltage V is calculated assuming an effective spacing between the electrodes for electric field purposes equal to the center-to-center spacing $d$ of 5 micrometers. The uncorrected voltage $V'$ is taken to be $$V' = \pm \frac{\Delta_1 n}{\tfrac{1}{2}n^3 r_{33}} d \qquad (35)$$

Applying a voltage V correction factor of $a/2d$ yields $$V = \pm \frac{\Delta_1 n}{n^3 r_{33}} a \qquad (36)$$

Substituting values, $$V = \pm 6.0 \text{ volts.}$$

The maximum electric field strength E is the ratio of 6 volts to the electrode spacing of 2 micrometers, so E = 30,000 volts per centimeter. This value is well under the breakdown strength of LiNbO$_3$ previously mentioned. Varnish may be applied if required to protect the electrodes from breakdown in air.

The capacitance of the embodiment is estimated as if there are three parallel capacitors with parallel plates of width $w = 3$ micrometers spaced at $d = 5$ micrometers. Using $\epsilon = 30\epsilon_0$, and $L = 1.5$ millimeters with the equation $$C = 3\frac{\epsilon w L}{d} \qquad (37)$$

and substituting values yields $$C = 0.72 \text{ picofarads.}$$

The modulation power from equation (31) with the C and V of this Example V is $P = 13$ microwatts at 1 megahertz.

COUPLING TO OPTICAL FIBERS

A substrate bearing one or more modulator/switch devices of the type shown in FIG. 1 is suitably coupled to one or more optical fibers by means of a butt optical joint such as is suggested in U.S. Pat. No. 3,976,358 to G. H. B. Thompson. For instance, the branch including waveguides 5 and 6, can be coupled to input optical fibers. Of course, the relatively narrow waveguides must frequently lead together to waveguide 3 from a spacing perhaps several times the width $a$ of waveguide 3 so that larger optical fiber diameters may be accommodated. Then light incident through each optical fiber is able to enter an appropriate side of waveguide 3 through one of the waveguides 5 or 6.

Figure 8:
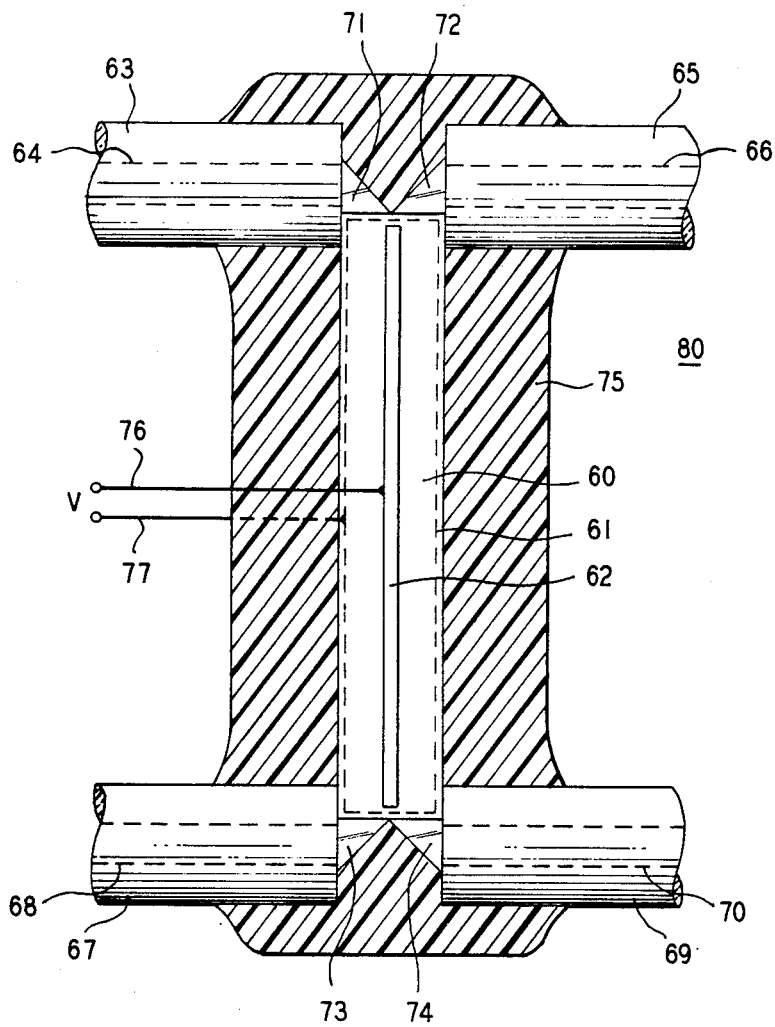
FIG. 8 shows a greatly magnified cutaway plan view of an optical modulator/switch according to the present invention for use as an encapsulated discrete component with optical fibers. As in FIG. 1 the length dimension is foreshortened.
Figure 9:
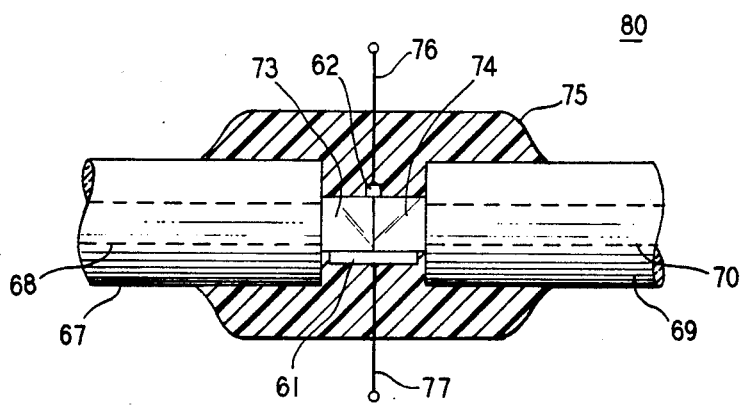
FIG. 9 shows a cutaway profile view of the discrete component of FIG. 8.

FIGS. 8 and 9 show an alternative means of coupling to the optical fibers which prevents the outside diameter of the optical fibers from being a constraint on design. Briefly, this approach uses a pair of separating mirrors or prisms at each end of a multimode waveguide 60 for coupling into optical fibers located transverse to the waveguide.

As shown in FIG. 8, a multimode waveguide 60 having electrodes 61 and 62 connected by conductors 76 and 77 to a source of voltage V operates as a multimode waveguide modulator/switch in the manner previously discussed. Waveguide 60 is made from a slab of LiNbO$_3$ polished down to suitable thickness. Separating prisms 71 and 72 are respectively brought by micromanipulation and cemented to right and left sides of an input end of the waveguide 60. Also, the prisms 71 and 72, which have oblique reflecting surfaces oriented at an angle sufficient to provide total internal reflection, are cemented to the cores 64 and 66 of two input fiber waveguides 63 and 65. The input fibers are essentially in the same plane as waveguide 60 and collinear with respect to each other. The fibers are also approximately perpendicular to the length of waveguide 60. Similarly, separating mirrors 73 and 74 located at an output end of the waveguide 60 are cemented to the waveguide and to cores 68 and 70 of the fiber waveguides 67 and 69 which form an output medium for the device. The entire assembly of waveguide 60 with electrodes 61 and 62, mirrors 71 through 74 and optical fibers 63, 65, 67 and 69 is potted for mechanical strength in epoxy or other suitable medium 75, which has a sufficiently low refractive index compared to the separating prisms and waveguide 60 to permit total internal reflection therein.

Light entering the multimode switch 80 through optical fiber 63 via core 64 passes into prism 71 and is reflected into the left side of the input end of waveguide 60. The light energy so introduced propagates in even and odd modes through waveguide 60 and if the voltage V is suitably selected, the light exits from the right side of the output of lower end of waveguide 60, enters the prism-shaped separation element 74 and is reflected and coupled into the core 70 of output optical fiber 69. At another voltage V, or perhaps no voltage, the light is equally coupled to both separation elements 73 and 74 and exits approximately equally through output fibers 67 and 69. At still another voltage V the light as a whole essentially exits through the left side of the output end of waveguide 60 and is entirely coupled to and carried away by optical fiber 67.

Light entering through both optical fibers 63 and 65 simultaneously, bearing distinct modulations, can be simultaneously introduced by means of the prism assembly including elements 71 and 72 so as to propagate in even and odd modes in the waveguide 60. At one voltage V, waveguides 64 and 66 are respectively coupled to waveguides 67 and 69, and at another voltage V waveguides 64 and 66 are respectively coupled to waveguides 69 and 67 in reverse manner. Alternatively, at still another voltage or no voltage at all the light in waveguides 64 and 66 can be combined so that equal amounts of both input modulations exit via light waves from waveguide fibers 67 and 69 due to a 3db coupler action.

Thus, the assembly of FIG. 8 permits its use as a discrete optical fiber voltage-controlled component having uses as an amplitude modulator, switch, multiplexer and demultiplexer. When it is desirable to control the polarization of the input light, optical fibers having an elliptical or other polarization-conserving cross-section may be used.

FIG. 9 shows an end profile view of the optical multimode switch of FIG. 8. Optical fibers 67 and 69 having cores 68 and 70 are butted against prisms 73 and 74, the oblique faces of which appear as adjacent squares in FIG. 9. Epoxy 75 encapsulates the entire assembly including waveguide 60 behind prisms 73 and 74. A source of voltage V is conductively coupled via conductors 76 and 77 to narrow stripe 62 and wide electrode 61 on opposite faces of the multimode waveguide. The electrode 61 need not necessarily be a thin evaporated deposit as suggested in FIG. 9, but may alternatively be a metallic pedestal 77 terminating in a tip 61. The tip may be either equal in width to the waveguide 60 or even wider for suitably substantial mechanical support.

The embodiments of the invention hereinabove described are to be considered as being only illustrative and not exhaustive. Many embodiments of the invention can be fashioned utilizing appropriate materials, shapes and dimensions so as to fully realize the utility of the invention by application of its principles.

What is claimed is:

1. An optical modulator/switch device for optical energy having a wavelength $\lambda$ comprising
   a multimode optical strip waveguide including a length of material having an undivided cross-section along all of said length for propagation of optical modes therealong, said length being an integer multiple between 1 and 4 inclusive of approximately one-half of a least critical length in multimode optical strip waveguides of a type having the same cross-sectional dimensions as said waveguide, said least critical length being the least length such that optical energy of said wavelength $\lambda$ incident upon only one side of said cross-section at an input end exits essentially on the opposite side of said cross-section at an output end after propagation along said critical length;
   means for introducing optical energy so as to be incident upon only one side of said cross-section and so as to propagate in a plurality of optical modes therefrom;
   means for applying a physical influence so as to induce a transversely symmetric refractive index change all along said length of material of said multimode strip waveguide, said applying means causing said waveguide material to differentially affect the velocity of propagation of one or more of said optical modes relative to the others, so that at one value of said physical influence and propagating optical energy becomes concentrated in said waveguide at only a first output side of said cross-section and exits therefrom and so that at another value of said physical influence said propagating optical energy becomes concentrated in said waveguide at only an opposite output side of said cross-section and exits therefrom;
   and means for separating any of said optical energy exiting from said first output side from any of said optical energy exiting from said opposite output side;
   whereby modulation and switching of said exiting optical energy are able to be obtained by means of said device.

2. The optical modulator/switch device claimed in claim 1 wherein said material of said waveguide has an effective width $a$ and a refractive index $n$ at the wavelength $\lambda$, said length being an integer multiple between 1 and 4 inclusive of approximately $2na^2/\lambda$.

3. The optical modulator/switch device claimed in claim 1 wherein said material of said waveguide has an effective width $a$ and a refractive index $n$ at the wavelength $\lambda$, said length being approximately $2na^2/\lambda$.

4. The optical modulator/switch device claimed in claim 1 wherein said means for separating exiting optical energy comprises symmetric branch waveguides respectively leading away from said output sides of said waveguide.

5. The optical modulator/switch device claimed in claim 1 wherein said output sides of said waveguide are coupled by said separating means to respective optical fibers, said optical fibers forming an output medium for said modulator/switch device.

6. The optical modulator/switch device claimed in claim 1 wherein said introducing means comprises a relatively narrow waveguide leading to said one side of said cross-section.

7. The optical modulator/switch device claimed in claim 1 wherein said introducing means comprises branch waveguides leading to distinct sides of said cross-section, one of said distinct sides being the recited one side of said cross-section, whereby said optical energy may enter an appropriate side of said waveguide through one of said branch waveguides.

8. The optical modulator/switch device claimed in claim 1 wherein said waveguide has a width $a$, said physical influence is an electrical voltage, and said applying means comprises at least two electrodes, at least one of said electrodes being on a bottom side of said waveguide and one and only one of said electrodes being located on a top side of said waveguide, said one and only one electrode being in width less than one-fourth of said width $a$ and located symmetrically with respect to said waveguide width.

9. The optical modulator/switch device claimed in claim 1 wherein said waveguide has a width $a$ and said physical influence applying means comprises at least three electrodes, at least one of said electrodes being on a bottom side of said waveguide and two and only two of said electrodes being located on and only on a top side of said waveguide, said top two electrodes each being in width less than one-fourth of said width $a$ and being located symmetrically with respect to said waveguide width.

10. The optical modulator/switch device claimed in claim 9 wherein said physical influence applying means further comprises means for maintaining each of said top two electrodes at the same electrical potential as the other.

11. The optical modulator/switch device claimed in claim 1 wherein said waveguide has a width $a$ and said physical influence applying means comprises at least four electrodes, each of said four electrodes being on the same side of said waveguide and being in width less than one-fourth of said width $a$, said at least four electrodes being located symmetrically with respect to said waveguide width.

12. The optical modulator/switch device claimed in claim 11 wherein said physical influence applying means comprises means for maintaining said four electrodes at spatially alternating relative electrical potentials.

13. The optical modulator/switch device claimed in claim 1 wherein said physical influence applying means affects the velocity of propagation of the optical modes which are odd modes without by comparison substantially affecting the propagation of the optical modes which are even modes.

14. The optical modulator/switch device claimed in claim 1 wherein said physical influence applying means affects the velocity of propagation of the optical modes which are even modes without by comparison substantially affecting the propagation of the optical modes which are odd modes.

15. The optical modulator/switch device claimed in claim 1 wherein said physical influence applying means affects the velocity of propagation of the optical modes which are even modes and affects the velocity of propagation of the optical modes which are odd modes so that the even modes as a group are affected in velocity oppositely from the odd modes as a group.

16. The optical modulator/switch device claimed in claim 1 wherein said applying means and said material cooperate electrooptically.

17. An optical device for processing optical energy of wavelength $\lambda$ comprising
a single optical strip waveguide having a refractive index $n$, a thickness, a lateral width $a$ greater than twice said thickness, and a length $L$ between an input end and an output end;
means for introducing said optical energy into only one side of said width at said input end of said strip waveguide, said waveguide permitting said energy to propagate in even and odd modes to first and second sides of said width at said output end for exit of said optical energy;
and means for applying to said strip waveguide an electric field so as to produce a refractive index change in said waveguide having substantial lateral variation but being essentially bilaterally symmetric, said applying means comprising at least two electrodes to which a voltage is providable for affecting the propagation of said even and odd modes so that said optical energy as a whole essentially exits from said first side of said output end of said waveguide when one value of said voltage is provided and so that said optical energy exiting from said first side of said output end is substantially changeable in intensity in response to a change in said voltage, whereby said optical energy is able to be processed with respect to the amount thereof leaving said first side of said output end of said waveguide.

18. The optical device claimed in claim 17 wherein said waveguide is made of an electrooptic material having an electrooptically most sensitive direction, said electric field has components in said waveguide width parallel to said most sensitive direction, and one of said applying means electrodes is a stripe having a stripe width less than one-fourth of said waveguide width, the electrodes being located so as to permit said electric field components parallel to said most sensitive direction to have substantial lateral variation in field strength but be essentially bilaterally symmetric in field strength and field direction, whereby said even and odd modes are able to be differentially affected in their velocity of propagation.

19. The optical device claimed in claim 18 wherein said electrooptic material has a $c$-axis, said electrooptically most sensitive direction lies along said $c$-axis, and said modes are polarized essentially parallel to said $c$-axis.

20. An optical modulator/switch device comprising
a multimode optical strip waveguide comprising a center strip with double waveguide branches at each end of said center strip, said center strip having a width of less than 50 microns, a thickness of less than 25 microns, and a length of less than 1 centimeter (10,000 microns) and being of an electrooptic material;
electrode means attached to said center strip comprising two electrodes including at least a first electrode of approximately the length of said center strip and a width less than one-fourth of said strip width; and
means for providing an electrical voltage to said electrode means so that a bilaterally symmetrical refractive index change is impressed in said center strip when said voltage is present at said providing means.

21. The optical modulator/switch device claimed in claim 20 wherein
said two electrodes include a relatively wide electrode located on a side of said waveguide opposite said quarter-width electrode.

22. The optical modulator/switch device claimed in claim 21 wherein
said electrode means further comprises a third electrode having essentially the same shape and size as said first electrode and being located on one face of said center strip with said first electrode so as to be in bilaterally symmetrical relation to said first electrode.

23. The optical modulator/switch device claimed in claim 20 wherein
said electrode means is exactly four parallel electrodes including in their number said two electrodes, said four electrodes being located on one face of said center strip, each of said four electrodes having a width less than one-fourth of said strip width.

* * * * *

UNITED STATES PATENT AND TRADEMARK OFFICE
CERTIFICATE OF CORRECTION

PATENT NO. : 4,127,320

DATED : November 28, 1978

INVENTOR(S) : Tingye Li

It is certified that error appears in the above-identified patent and that said Letters Patent are hereby corrected as shown below:

Column 9, line 64, "frofm" should read --from--.
Column 12, line 1, "sigh" should read --sign--.
Column 13, line 59, "electroopic" should read --electrooptic--.
Column 14, line 1, "electroopic" should read --electrooptic--;
line 58, "resut" should read --result--. Column 15, line 27,
insert the word "So" on the left hand margin between
equations (24) and (25). Column 19, line 10, after "output,"
"of" should read --or--. Column 20, claim 1, line 22, "and"
should read --said--.

Signed and Sealed this

Tenth Day of July 1979

[SEAL]

Attest:

LUTRELLE F. PARKER

*Attesting Officer*  *Acting Commissioner of Patents and Trademarks*